US011938653B2

(12) United States Patent
Li et al.

(10) Patent No.: US 11,938,653 B2
(45) Date of Patent: Mar. 26, 2024

(54) POWDER DRY-PRESSING MOLDING DEVICE AND METHOD

(71) Applicants: QINGDAO UNIVERSITY OF TECHNOLOGY, Shandong (CN); SHENYANG HONGYANG PRECISION CERAMICS CO., LTD., Liaoning (CN)

(72) Inventors: Changhe Li, Qingdao (CN); Mingcun Shi, Qingdao (CN); Xiangyang Ma, Qingdao (CN); Baoda Xing, Qingdao (CN); Xiaohong Ma, Qingdao (CN); Yanbin Zhang, Qingdao (CN); Min Yang, Qingdao (CN); Xin Cui, Qingdao (CN); Teng Gao, Qingdao (CN); Xiaoming Wang, Qingdao (CN); Yali Hou, Qingdao (CN); Han Zhai, Qingdao (CN); Zhen Wang, Qingdao (CN); Bingheng Lu, Qingdao (CN); Huajun Cao, Qingdao (CN); Naiqing Zhang, Qingdao (CN); Qidong Wu, Qingdao (CN)

(73) Assignees: QINGDAO UNIVERSITY OF TECHNOLOGY, Shandong (CN); SHENYANG HONGYANG PRECISION CERAMICS CO., LTD., Liaoning (CN)

( * ) Notice: Subject to any disclaimer, the term of this patent is extended or adjusted under 35 U.S.C. 154(b) by 433 days.

(21) Appl. No.: 17/282,211

(22) PCT Filed: May 8, 2020

(86) PCT No.: PCT/CN2020/089263

§ 371 (c)(1),
(2) Date: Apr. 1, 2021

(87) PCT Pub. No.: WO2021/164138

PCT Pub. Date: Aug. 26, 2021

(65) Prior Publication Data

US 2022/0143867 A1 May 12, 2022

(30) Foreign Application Priority Data

Feb. 18, 2020 (CN) .......................... 202010099070.2

(51) Int. Cl.
*B28B 7/00* (2006.01)
*B28B 7/10* (2006.01)

(52) U.S. Cl.
CPC .............. *B28B 7/0097* (2013.01); *B28B 7/10* (2013.01)

(58) Field of Classification Search
CPC ......... B28B 7/0097; B28B 7/10; B28B 3/086; B30B 11/007; B30B 11/02
See application file for complete search history.

(56) References Cited

U.S. PATENT DOCUMENTS 3,985,844 A 10/1976 Huschka et al.

FOREIGN PATENT DOCUMENTS

CN 1109404 A 10/1995
CN 2552663 Y * 5/2003

(Continued)

OTHER PUBLICATIONS

Nov. 17, 2020 International Search Report issued in International Patent Application No. PCT/CN2020/089263.

(Continued)

*Primary Examiner* — Nahida Sultana
*Assistant Examiner* — Virak Nguon
(74) *Attorney, Agent, or Firm* — JCIPRNET

(57) ABSTRACT

The present invention relates to a powder dry-pressing molding device and method. The powder dry-pressing mold- (Continued)

ing device includes a rack, the rack is provided with an first pressure mechanism, a workbench mechanism and a second pressure mechanism in sequence along an up-and-down direction, and one side of the workbench mechanism is provided with a scraping mechanism; the first pressure mechanism includes an upper slide block capable of moving up and down, and an upper punch is disposed at a bottom of the upper slide block; the workbench mechanism includes a middle mold seat, a workbench is fixed above the middle mold seat, a middle mold is disposed inside the middle mold seat, and a mandrel runs through the inside of the middle mold; the second pressure mechanism includes a lower slide block capable of moving up and down, a lower punch is fixed at the top end of the lower slide block, and the lower punch is capable of extending into a compacting space between the mandrel and the middle mold; and the scraping mechanism includes a pusher connected with a scraping driving mechanism and capable of moving along the workbench, the pusher is provided with a feeding channel capable of being communicated with the compacting space, and the feeding channel is capable of being communicated with a barrel disposed on the rack. The dry-pressing molding device of the present invention has a high degree of automation, can scrape the powder, and has a good processing effect.

18 Claims, 13 Drawing Sheets

(56) References Cited

FOREIGN PATENT DOCUMENTS

| | | | | |
|---|---|---|---|---|
| CN | 2666658 | Y | | 12/2004 |
| CN | 2758047 | Y | | 2/2006 |
| CN | 1817630 | A | | 8/2006 |
| CN | 101890497 | A | | 11/2010 |
| CN | 202895418 | U | | 4/2013 |
| CN | 203185666 | U | | 9/2013 |
| CN | 103357807 | A | | 10/2013 |
| CN | 104475725 | A | | 4/2015 |
| CN | 106079550 | A | | 11/2016 |
| CN | 209110178 | U | | 7/2019 |
| CN | 209614242 | U | | 11/2019 |
| CN | 209774992 | U | * | 12/2019 |
| CN | 209774992 | U | | 12/2019 |
| RU | 2041061 | C1 | | 8/1995 |

OTHER PUBLICATIONS

Nov. 17, 2020 Written Opinion issued in International Patent Application No. PCT/CN2020/089263.

* cited by examiner

POWDER DRY-PRESSING MOLDING DEVICE AND METHOD

BACKGROUND

Technical Field

The present invention relates to the technical field of processing and molding of alumina ceramic, and specifically relates to a powder dry-pressing molding device and method.

Related Art

Descriptions herein only provide background techniques related to the present invention, and do not necessarily constitute the related art.

In ceramic processing, alumina is the most common material. The alumina ceramic is a ceramic material based on alumina ($Al_2O_3$) and is used in thick film integrated circuits. The alumina ceramic has better conductivity, mechanical strength and high temperature resistance. It should be noted that ultrasonic cleaning is required. The alumina ceramic is a kind of ceramics with a wide range of applications. Due to the superior performance, the alumina ceramic has become more and more widely used in the modern society to meet the needs of daily use and special performance.

The alumina ceramic is divided into high-purity type alumina ceramic and common alumina ceramic. The high-purity alumina ceramic is a ceramic material with the $Al_2O_3$ content of 99.9% or more. Because the sintering temperature of the high-purity alumina ceramic is as high as 1,650-1,990° C. and the transmission wavelength is 1 to 6 μm, the high-purity alumina ceramic is generally made into molten glass to replace a platinum crucible. Due to the light transmission and resistance to alkali metal corrosion, the high-purity alumina ceramic can be used for a sodium lamp. In the electronic industry, the high-purity alumina ceramic can be used for an integrated circuit substrate and a high-frequency insulating material. The common alumina ceramic can be divided into varieties such as 99 ceramic, 95 ceramic, 90 ceramic, and 85 ceramic according to different $Al_2O_3$ contents. Sometimes, the alumina ceramic with the $Al_2O_3$ content of 80% or 75% also belongs to the common alumina ceramic series. The 99 alumina ceramic material is used to make high-temperature crucibles, refractory furnace pipes and special wear-resistant materials, such as ceramic bearings, ceramic seals and water valves. The 95 alumina ceramic is mainly used for corrosion-resistant and wear-resistant components. The 85 alumina ceramic is often doped with some talc to improve the electrical performance and mechanical strength, and can be sealed with metals such as molybdenum, niobium and tantalum, and some are used for electrical vacuum devices.

The molding methods of alumina ceramic products include dry pressing, grouting, extrusion, cold isostatic pressing, injection, casting, hot pressing, hot isostatic pressing, and the like. In recent years, domestic and foreign molding technology methods such as pressure filtration molding, direct solidification injection molding, gel injection molding, centrifugal grouting molding and solid free molding have been developed. Products with different product shapes, sizes, complex models and precision require different molding methods.

1. Dry-pressing molding: The alumina ceramic dry-pressing molding technology is limited to an object with a simple shape, an inner wall thickness of more than 1 mm, and a length to diameter ratio of not more than 4:1. The molding method adopts uniaxial molding or bidirectional molding. Presses include a hydraulic press and a mechanical press, and can adopt a semi-automatic or fully-automatic molding manner. The maximum pressure of a press is 200 Mpa. The output can reach 15 to 50 pieces per minute. Since the stroke pressure of the hydraulic press is uniform, the height of the pressed part is different when the powder filling is different. The pressure applied by the mechanical press changes with the amount of powder filling, which will easily cause difference in size shrinkage after sintering and affect the product quality. Therefore, uniform distribution of powder particles during dry pressing is very important for mold filling. The accuracy of the filling amount has a great influence on the dimensional accuracy control of the manufactured alumina ceramic parts. The powder particles greater than 60 μm and between 60 meshes and 200 meshes can obtain the maximum free flow effect and the best pressure molding effect.

2. Grouting molding method: Grouting molding is the earliest molding method used for the alumina ceramic. Due to the use of plaster molds, the cost is low, and components with large sizes and complex shapes are easy to mold. The key to grouting molding is the preparation of alumina slurry. Usually, water is used as a flux medium, then a debonding agent and a binder are added, the gas is exhausted after full grinding, and then, the product is poured into a plaster mold. Due to the absorption of moisture by the capillary of the plaster mold, the slurry solidifies in the mold. During hollow grouting, when the mold wall absorbs the slurry to the required thickness, the excess slurry needs to be poured out. In order to reduce the blank shrinkage, high-concentration slurry should be used as much as possible.

3. Hot casting molding: Hot casting molding is a relatively extensive production process for producing special ceramics. The basic principle is as follows: by means of the characteristics of paraffin molten by heating and solidified by cooling, non-plastic infertile ceramic powder and hot paraffin liquid are uniformly mixed to form flowable slurry, and the slurry is injected into a metal mold under a certain pressure and molded and cooled; after the paraffin slurry is solidified, a molded blank is removed from the mold; the blank is properly trimmed, buried in an adsorbent and heated for paraffin removal; and then, the blank after paraffin removal is sintered to form a final product.

The inventors found that the most widely used traditional dry-pressing molding equipment has the defects of complex structure and inconvenient operation. A traditional screw press carries out molding by means of the impact kinetic energy of a flywheel system, the pressing speed is too high, and the pressure rise is uneven, so that the actual pressure of each part of the powder is uneven, resulting in poor blank density uniformity and even serious defects of cracking and larger deformation. By full use of the characteristic of hydraulic transmission, a traditional hydraulic molding machine can obtain great pressure, easily makes a linear movement, realizes speed adjustment and automatic control and applies general standardized components, but has the main problems of slow pressure rise, complex operation and high processing cost.

Lu Yourong of Shanghai Yunliang Forging Machine Co., Ltd. invented a friction screw press, including a flywheel, the flywheel is connected with a slide block through a screw pair, the flywheel is provided with a first edge and a second edge, the first edge is disposed opposite to the first end of a first friction wheel, the second edge is disposed opposite to the first end of a second friction wheel, the center of the second end of the first friction wheel is provided with a rotating shaft, the rotating shaft is hermetically connected with a first cylinder body, a first return mechanism is disposed between the rotating shaft and the first cylinder body, the first end of the first friction wheel is also provided with a cavity as a second cylinder body, the second cylinder body is hermetically connected with the second end of the second friction wheel, the second friction wheel rotates with the first friction wheel, and a second return mechanism is disposed between the second friction wheel and the first friction wheel. In the screw press of this invention, by the design of the first friction wheel and the second friction wheel, the structure is compact; and by the ingenious design of the first cylinder body and the second cylinder body, the first friction wheel and the second friction wheel can rotate simultaneously, and the second friction wheel can move axially relative to the first friction wheel.

This device has the advantages of simple structure, convenient operation, and full use of the impact kinetic energy of the flywheel. However, the pressing speed is too high, and the pressure rise is uneven, so that the actual pressure of each part of the powder is uneven, resulting in poor blank density uniformity and even serious defects of cracking and larger deformation.

Huang Jing from Jiangxi Province disclosed a fully-automatic numerical control dry powder hydraulic press, including an upper beam, a movable beam, a lower beam and a feeding box which are connected by an upright post, a main cylinder is disposed on the upper beam, a master plate is disposed on a working rod of the main cylinder, an upper punch is disposed on the master plate, the upper end of a piston rod in a lower cylinder on the lower beam is connected with a mold frame, a mold is disposed in the mold frame, a lower punch is disposed on the mold frame, the lower end of the piston rod is provided with a threaded shaft section, a driven gear is movably disposed on the threaded shaft section, the driven gear is meshed with a driving gear, the lower end surface of the driven gear is supported on two slide blocks capable of relatively moving left and right, and a digital displacement sensor is disposed on the threaded shaft section. This utility model can realize the downward movement of powder during feeding, realize gradual feeding and realize excessive and insufficient feeding, so as to improve the fluidity and uniformity of the powder and improve the product quality, and can realize multiple repeated use of the same product of multiple specifications, so as to reduce the number of molds and reduce the manufacturing cost of the molds.

By full use of the characteristic of hydraulic transmission, this device can obtain great pressure, easily makes a linear movement and realizes speed adjustment and automatic control, but has the defects of complex structure and slow pressure rise.

Tao Shulin of Jiangsu Province invented a 60-ton type pull rod feeding device for a dry powder press. When a fully-automatic 60-ton product molding press special for the powder metallurgy industry presses products, this device can ensure that the raw powder can be efficiently and automatically conveyed into a molding cavity. This device includes a main transmission shaft, a transmission roller bearing, a feeding cam set, a feeding lever, a joint bearing 1, a joint bearing 2, a pull rod, a cylinder assembly, a feeding swing arm, a rotating shaft, a vertical bearing seat, a feeding rod seat, a feeding rod, a material shoe bracket, a material shoe, a material shoe working table, a gear set and a cylinder mounting bracket. This device is a bran-new automatic feeding device which has the advantages that under the condition of meeting various feeding requirements capable of being completed by the original automatic feeding device, the mechanism which requires several sets of gears to transmit power originally is greatly simplified, the cost is reduced, and the use efficiency and stability are further improved.

This device is simple in structure, high in practicability and improved in use efficiency and stability, but occupies a large space, is not compact in structure and cannot realize a scraping effect on a feed inlet.

SUMMARY

In order to overcome the defects in the prior art, the present invention provides a powder dry-pressing molding device which is compact in structure, capable of scraping a feed inlet, good in molding effect, and high in degree of automation.

In order to realize the above objectives, the present invention adopts the technical scheme as follows:

According to the first aspect, an embodiment of the present invention provides a powder dry-pressing molding device, including a rack, the rack is provided with a first pressure mechanism, a workbench mechanism and a second pressure mechanism in sequence along an up-and-down direction, and one side of the workbench mechanism is provided with a scraping mechanism.

The first pressure mechanism includes an upper slide block capable of moving up and down, the upper slide block is connected with an upper driving mechanism, and an upper punch is disposed at a bottom of the upper slide block.

The workbench mechanism includes a middle mold seat, a workbench is fixed above the middle mold seat, a middle mold is disposed inside the middle mold seat, a mandrel fixedly disposed coaxially with the middle mold runs through the inside of the middle mold, and a compacting space for containing powder is formed between the mandrel and the middle mold.

The second pressure mechanism includes a lower slide block capable of moving up and down, the lower slide block is connected with a lower driving mechanism, a lower punch is fixed at a top end of the lower slide block, and the lower punch is capable of extending into the compacting space between the mandrel and the middle mold and compacting the powder together with the upper punch.

The scraping mechanism includes a pusher connected with a scraping driving mechanism and capable of moving along the workbench, the pusher is provided with a feeding channel capable of being communicated with the compacting space, the feeding channel is capable of being communicated with a barrel disposed on the rack, and after the feeding channel is aligned with the compacting space, the lower punch moves downward to generate a vacuum so as to suck the powder into the compacting space.

With reference to the first aspect, an embodiment of the present invention provides a possible implementation of the first aspect: both ends of the upper slide block are fixedly provided with a first fixing seat respectively, the first fixing seat is fixedly provided with a first guide post, and the first guide post runs through a first guide seat fixed on the rack so as to guide the movement of the upper slide block.

With reference to the first aspect, an embodiment of the present invention provides a possible implementation of the first aspect: the upper driving mechanism includes an upper crankshaft capable of actively rotating and two first touch pieces fixed on the upper slide block, crank arms of the upper crankshaft are located between the two first touch pieces, the rotation of the upper crankshaft enables the crank arms to be in contact with the two first touch pieces, and the first touch pieces drive the upper slide block to move up and down.

With reference to the first aspect, an embodiment of the present invention provides a possible implementation of the first aspect: a part of the lower slide block below the workbench mechanism is fixedly provided with a second fixing seat, the second fixing seat is fixedly provided with a second guide post, and the second guide post runs through a second guide seat fixed on the rack so as to guide the movement of the lower slide block.

With reference to the first aspect, an embodiment of the present invention provides a possible implementation of the first aspect: the lower slide block is fixedly connected with one end of a resetting driving piece, the other end of the resetting driving piece is hinged to the rack, and the resetting driving piece is capable of driving the lower slide block to move downward to vacuumize the compacting space.

With reference to the first aspect, an embodiment of the present invention provides a possible implementation of the first aspect: the lower driving mechanism includes a lower crankshaft capable of actively rotating and two second touch pieces disposed on the lower slide block, the lower crankshaft is fixedly provided with two second touch pieces, crank arms of the lower crankshaft are disposed between the two second touch pieces, the rotating lower crankshaft is capable of being in contact with the two second touch pieces to drive the lower slide block to move up and down, a limiting block is disposed below the lower second touch piece, and the limiting block is configured to limit the downward movement of the lower slide block.

With reference to the first aspect, an embodiment of the present invention provides a possible implementation of the first aspect: the periphery of a top of the mandrel is sleeved with a mandrel alloy sleeve, the inner surface of the middle mold is fixedly provided with a middle mold alloy sleeve, a bottom end of the mandrel is fixedly connected with a top end of a connecting rod, and after the connecting rod runs through the middle mold seat and the second pressure mechanism, a bottom end of the connecting rod is fixedly connected with the rack.

With reference to the first aspect, an embodiment of the present invention provides a possible implementation of the first aspect: the scraping driving mechanism includes a cam capable of rotating and provided with a wave structure in a near rest section and a connecting piece capable of being in contact with the cam, the connecting piece includes a first connecting part and a second connecting part which are vertically disposed, an end of the first connecting part is in contact with the cam, an intersecting position of the first connecting part and the second connecting part is rotationally connected with the rack, one end of the second connecting part is connected with the first connecting part, the other end of the second connecting part is connected with the rack through an elastic piece, the second connecting part is universally connected with one end of a middle piece, the other end of the middle piece is universally connected with a rotating piece disposed on the outer circumferential surface of a rotating shaft, the rotating shaft is capable of rotating, an end of the rotating shaft is fixedly connected with one end of a pull rod, the other end of the pull rod is provided with a clamping plate, the clamping plate is clamped and fixed to a first connecting shaft, both ends of the first connecting shaft are fixedly connected with one end of a connecting plate respectively, and the other ends of two connecting plates are hinged to two side surfaces of the pusher.

The rotation of the connecting piece can drive the rotating shaft to rotate through the middle piece, the rotating shaft can drive the pull rod to rotate, and the pull rod drives the pusher to move along the workbench through the first connecting shaft.

With reference to the first aspect, an embodiment of the present invention provides a possible implementation of the first aspect: a second connecting shaft is fixed between the two connecting plates, the second connecting shaft is hinged to the bottom of a U-shaped frame, the top end of the U-shaped frame is fixedly connected with one end of a compressing cylinder, the other end of the compressing cylinder is hinged to a hinged seat fixed on the rack, and the compressing cylinder enables the pusher to be attached to the workbench all the time.

According to the second aspect, an embodiment of the present invention provides a powder dry-pressing molding method. The pusher moves, the feeding channel is aligned with the compacting space, the lower punch moves downward to vacuumize the compacting space, the powder enters the compacting space, the pusher reciprocates along the workbench part above the compacting space to scrape the powder, and the upper punch moves downward and the lower punch moves upward to press the powder in two directions so as to form a blank.

The present invention has the following beneficial effects:

1. The powder dry-pressing molding device of the present invention has a compact structure and is provided with the scraping mechanism, the scraping mechanism is provided with the cam, the connecting piece, the middle piece and the like, the device adopts purely mechanical transmission, each part is convenient to adjust, and the near rest section of the cam is provided with the wave structure, so that the pusher can be driven to make a small range of reciprocating movement on the workbench above the middle mold, so as to scrape the powder.

2. The powder dry-pressing molding device of the present invention is provided with the first pressure mechanism and the second pressure mechanism, which can realize simultaneous or non-simultaneous pressurization on the powder in two directions, the blank density is uniform, and the molding effect is good.

3. In the powder dry-pressing molding device of the present invention, both the upper driving mechanism and the lower driving mechanism adopt a crankshaft, and the pressure is applied to the powder in many times and from light to heavy. The torque transmitted by the crankshaft is constant. During pressing, the upper slide block is driven by the upper crankshaft to move downward, the moment arm decreases slowly, and the punching force of the upper punch increases slowly. In a similar way, the lower slide block is driven by the lower crankshaft to move upward, and the punching force of the lower punch increases slowly. The problems of uneven blank density, cracking, larger deformation, and the like are improved.

4. The blank pressed and molded by the powder dry-pressing molding device of the present invention can be ejected out of the compacting space by the lower punch so as to complete demolding, so that the manual intervention is reduced, and the degree of automation is high.

5. The powder dry-pressing molding device of the present invention is provided with the resetting cylinder which can drive the lower punch to move downward so as to form a vacuum in the compacting space and suck the powder into the compacting space, so that the internal void of the powder is reduced, and the molding quality is higher.

6. In the powder dry-pressing molding device of the present invention, the inside of the middle mold adopts an alloy sleeve, and the outer side of the mandrel adopts an alloy sleeve, thereby ensuring that the mold wall has higher smoothness, geometric accuracy and dimensional accuracy and higher surface hardness. The device can be adapted to various powders having large abrasiveness, and is high in abrasion resistance, long in service life and easy in demolding, and the product specifications are consistent.

BRIEF DESCRIPTION OF THE DRAWINGS

The accompanying drawings constituting a part of this application are used for providing further understanding for this application. Exemplary embodiments of this application and descriptions thereof are used for explaining this application and do not constitute a limitation to this application.

Figure 1:
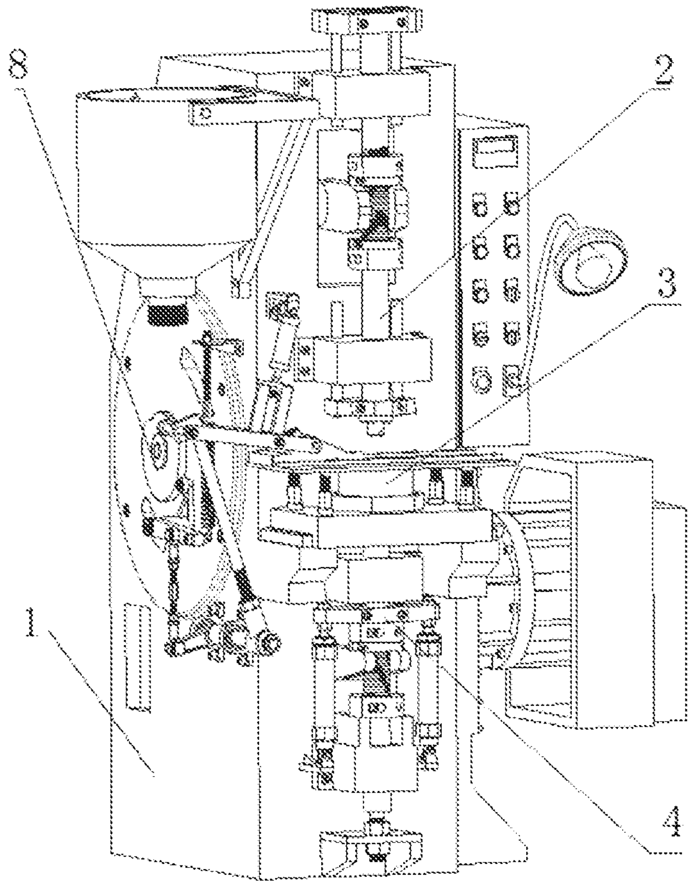
FIG. 1 is a first schematic view of an overall structure according to an embodiment 1 of the present invention.

1, rack; 2, first pressure mechanism; 3, workbench mechanism; 4, second pressure mechanism; 5, mandrel; 6, connecting rod; 7, resetting cylinder; 8, scraping mechanism; 9, illuminating lamp;

2-1, upper slide block; 2-2, first fixing seat I; 2-2-1, first fixing part; 2-2-2, second fixing part; 2-2-3, third fixing part; 2-3, first fixing seat II; 2-3-1, fourth fixing part; 2-3-2, fifth fixing part; 2-4, first guide seat I; 2-5, first guide seat II; 2-6, first guide post I; 2-7, first guide post II; 2-8, washer nut; 2-8-1, right leaf washer part; 2-8-2, left leaf washer part; 2-8-3, washer nut fastening screw; 2-9, half nut; 2-9-1, right leaf half nut part; 2-9-2, left leaf half nut part; 2-9-3, set screw; 2-9-4, half nut fastening screw; 2-10, upper punch; 2-11, upper crankshaft;

3-1, middle mold body; 3-2, middle mold alloy sleeve; 3-3, lug boss; 3-4, middle mold seat; 3-4-1, middle mold support seat; 3-4-2, middle mold nesting cylinder; 3-4-3, middle mold nesting set screw; 3-4-4, internal thread fastening sleeve; 3-5, workbench; 3-5-1, threaded connecting rod; 3-5-2, guide bar screw; 3-5-3, guide bar;

4-1, lower slide block; 4-2, lower punch; 4-3, second fixing seat; 4-3-1, sixth fixing part; 4-3-2, seventh fixing part; 4-4, second guide seat; 4-5, lower crankshaft; 4-6, second touch piece; 4-7, limiting block; 4-8, limiting plate;

5-1, mandrel body; 5-2, mandrel alloy sleeve;

8-1, pusher; 8-1-1, feeding channel; 8-2, cam; 8-3, connecting piece; 8-3-1, first push rod; 8-3-2, second push rod; 8-3-3, roller; 8-3-4, roller limiting cover; 8-3-5, connecting post; 8-3-6, support post for internal hexagonal extension spring; 8-3-7, fastening nut for support post for internal hexagonal extension spring; 8-4, spring; 8-5, fixing rod; 8-6, double threaded connecting rod; 8-7, joint bearing; 8-8, joint bearing fastening nut; 8-9, joint bearing fastening bolt; 8-10, joint bearing connecting bolt; 8-11, L-shaped sleeve; 8-12, rotating shaft; 8-13, vertical mounted bearing; 8-14, internal hexagonal flat-end set screw; 8-15, T-shaped sleeve; 8-15-1, fastening cover; 8-15-2, T-shaped sleeve fastening nut; 8-16, pull rod; 8-16-1, clamping plate; 8-17, pull rod locking nut; 8-18, threaded rod fixing plate; 8-19, compressing cylinder; 8-20, hinged seat; 8-20-1, lug plate; 8-21, base fixing shaft; 8-22, end cover; 8-23, pin shaft; 8-24, barrel; 8-25, barrel frame; 8-26, first connecting shaft; 8-27, connecting shaft fastening nut; 8-28, fulcrum screw; 8-29, connecting plate; 8-30, second connecting shaft; 8-31, U-shaped frame; 8-32, joint bearing locking nut.

DETAILED DESCRIPTION

It should be noted that the following detailed descriptions are all exemplary and are intended to provide a further understanding of this application. Unless otherwise specified, all technical and scientific terms used herein have the same meaning as commonly understood by a person of ordinary skill in the art to which this application belongs.

It should be noted that terms used herein are only for describing specific implementations and are not intended to limit exemplary implementations according to this application. As used herein, the singular form is intended to include the plural form, unless the context clearly indicates otherwise. In addition, it should further be understood that terms “comprise” and/or “include” used in this specification indicate that there are features, steps, operations, devices, components, and/or combinations thereof.

For convenience of description, the words “above”, and “below” only indicate directions consistent with those of the accompanying drawings, are not intended to limit the structure, and are used only for ease and brevity of illustration and description, rather than indicating or implying that the mentioned device or element needs to have a particular orientation or needs to be constructed and operated in a particular orientation. Therefore, such terms should not be construed as a limitation on the present invention.

As described in the background art, an existing powder dry-pressing molding device has the effect of scraping a feed inlet of powder, and a blank has poor density uniformity and may have serious defects of cracking and deformation. In view of the above problems, the present application proposes a powder dry-pressing molding device.

Figure 2:
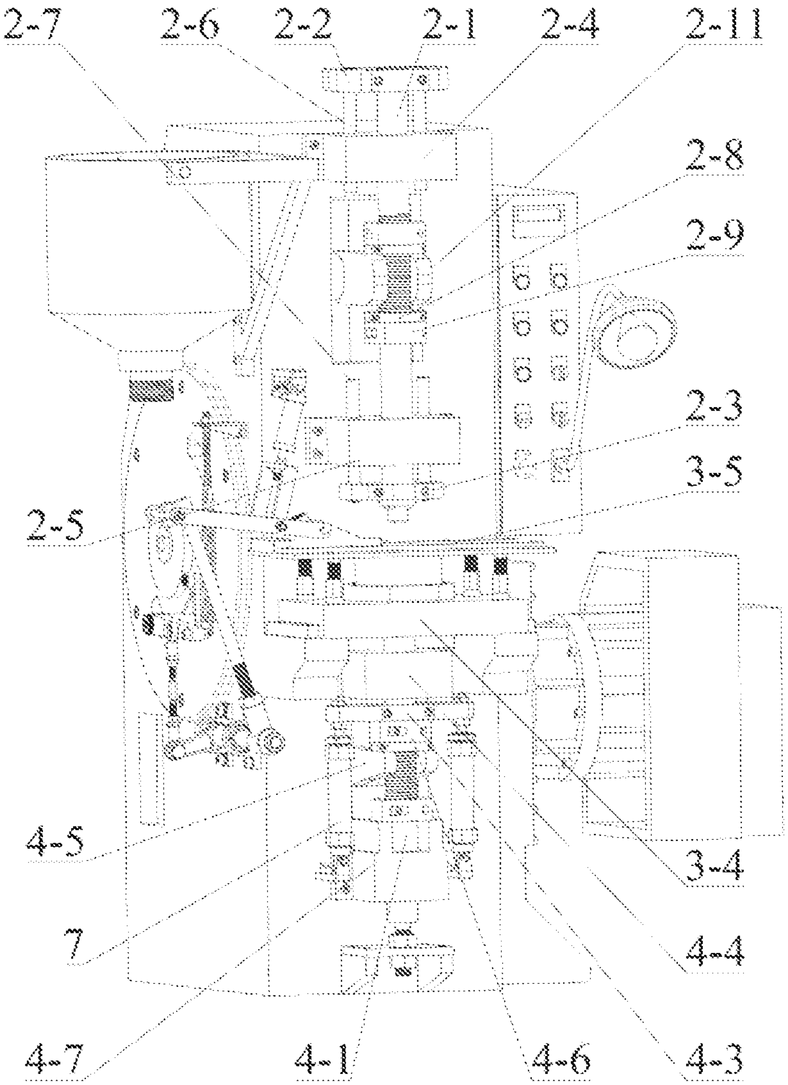
FIG. 2 is a second schematic view of the overall structure according to the embodiment 1 of the present invention.
Figure 3:
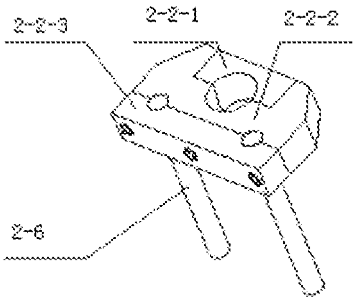
FIG. 3 is a schematic structural view of a first fixing seat I according to the embodiment 1 of the present invention.
Figure 4:
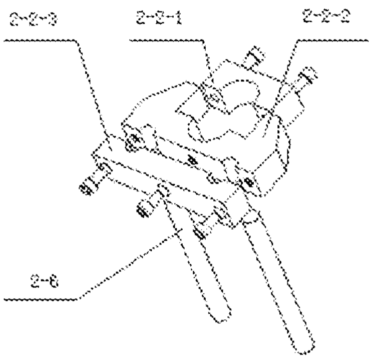
FIG. 4 is a schematic exploded view of FIG. 3 according to the embodiment 1 of the present invention.
Figure 5:
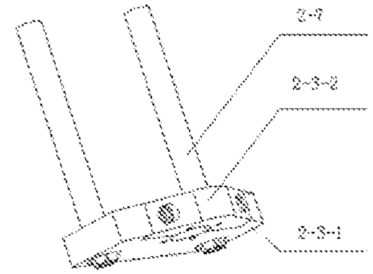
FIG. 5 is a schematic structural view of a first fixing seat II according to the embodiment 1 of the present invention.
Figure 6:
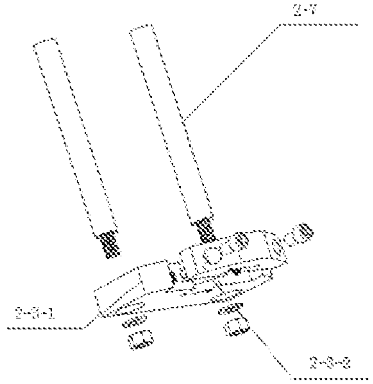
FIG. 6 is a schematic exploded view of FIG. 5 according to the embodiment 1 of the present invention.
Figure 7:
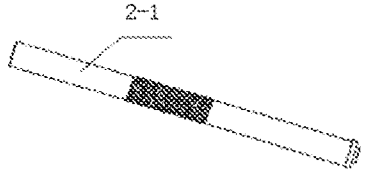
FIG. 7 is a first schematic structural view of an upper slide block according to the embodiment 1 of the present invention.
Figure 8:
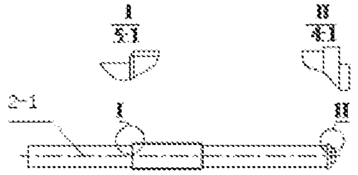
FIG. 8 is a second schematic structural view of the upper slide block according to the embodiment 1 of the present invention.
Figure 9:
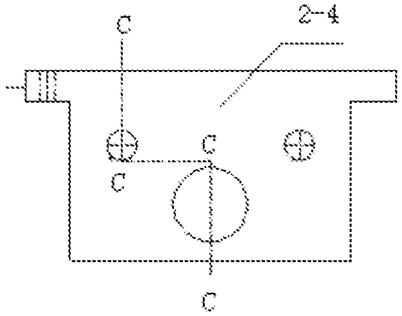
FIG. 9 is a schematic structural view of a first guide seat according to the embodiment 1 of the present invention.
Figure 10:
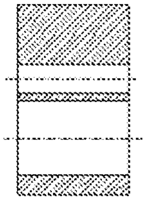
FIG. 10 is a schematic view of a direction C in FIG. 9 of the present invention.
Figure 11:
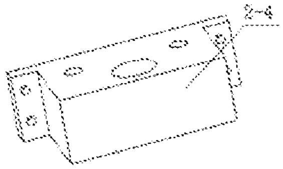
FIG. 11 is a schematic structural view of a first guide seat of the present invention.

In a typical embodiment 1 of the present application, as shown in FIG. 1 and FIG. 2, a powder dry-pressing molding device includes a rack 1. The rack is provided with a first pressure mechanism 2, a workbench mechanism 3 and a second pressure mechanism 4 in sequence along the up-and-down direction. One side of the workbench mechanism is provided with a scraping mechanism 8. The scraping mechanism is configured to scrape the powder.

As shown in FIG. 3 to FIG. 11, the first pressure mechanism includes a cylindrical upper slide block 2-1. The middle part of the upper slide block is provided with a threaded section. The bottom end of the upper slide block is provided with a stepped chuck. The upper and lower ends of the upper slide block are fixedly provided with a first fixing seat I 2-2 and a first fixing seat II 2-3 respectively.

The first fixing seat I includes a first fixing part 2-2-1, a second fixing part 2-2-2 and a third fixing part 2-2-3. The first fixing part and the second fixing part are fixedly connected by two hexagonal cylindrical head fastening screws and clamp the end of the upper slide block. The second fixing part and the third fixing part are fixedly connected by three hexagonal cylindrical head fastening screws and clamp the top end of a first guide post I 2-6.

The first fixing seat II includes a fourth fixing part 2-3-1 and a fifth fixing part 2-3-2. The fourth fixing part and the fifth fixing part are fixedly connected by hexagonal cylindrical head fastening screws and clamp the stepped chuck at the lower end of the upper slide block. The stepped chuck can limit the relative movement of the upper slide block and the first fixing seat II. A first guide post II 2-7 runs through the fourth fixing part. The end of the first guide post II is provided with a threaded post section. The diameter of the threaded post section is less than the diameter of a polished rod post section to form a stepped shaft structure. The threaded post section of the first guide post II runs through the fourth fixing part, and fixing nuts and a washer are tightened to realize the fixed connection between the first guide post II and the fourth fixing part.

The first guide post I and the first guide post II run through a first guide seat I 2-4 and a first guide seat II 2-5 through guide holes respectively. The first guide seat I and the first guide seat II are fixed on the rack by hexagonal cylindrical head screws so as to guide the movement of the upper slide block. The upper slide block also runs through the first guide seat I and the first guide seat II through guide holes. The first guide post, the upper slide block and the guide hole are all in clearance fit.

The upper slide block is connected with an upper driving mechanism. The upper driving mechanism can drive the upper slide block to move up and down. The upper driving mechanism includes an upper crankshaft and two first touch pieces fixedly disposed on the threaded section part of the upper slide block. The first touch piece includes a washer nut 2-8 and a half nut 2-9. The washer nuts of the two first touch pieces are disposed close to each other.

Figure 12:
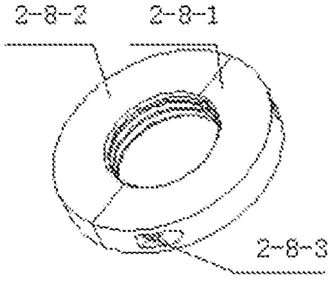
FIG. 12 is a schematic structural view of a washer nut according to the embodiment 1 of the present invention.
Figure 13:
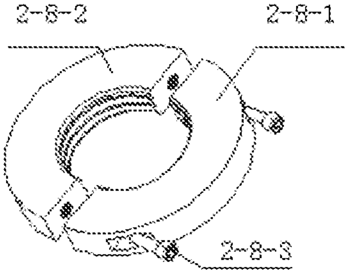
FIG. 13 is a schematic exploded view of FIG. 12 according to the embodiment 1 of the present invention.

As shown in FIG. 12 and FIG. 13, a washer nut is composed of a right leaf washer part 2-8-1, a left leaf washer part 2-8-2 and washer nut fastening screws 2-8-3. The right leaf washer part is connected with the left leaf washer part through the washer nut fastening screws, and internal threads are formed inside the washer nut.

Figure 14:
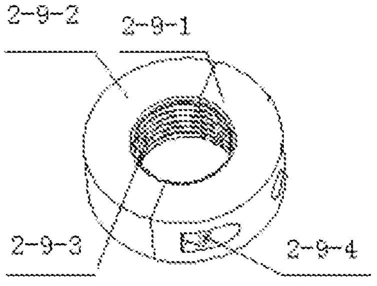
FIG. 14 is a schematic structural view of a half nut according to the embodiment 1 of the present invention.
Figure 15:
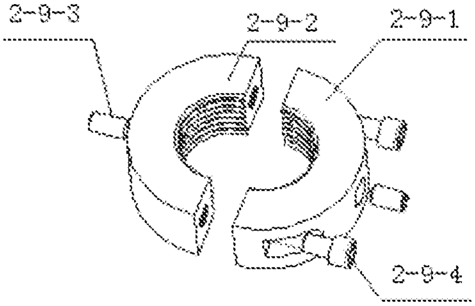
FIG. 15 is a schematic exploded view of FIG. 14 of the present invention.

As shown in FIG. 14 and FIG. 15, a half nut is composed of a right leaf half nut part 2-9-1, a left leaf half nut part 2-9-2, set screws 2-9-3 and half nut fastening screws 2-9-4. The right leaf half nut part is connected with the left leaf half nut part through two half nut fastening screws, internal threads are formed inside the half nut, and the middle of the right leaf half nut part and the middle of the left leaf half nut part are respectively provided with set screws for locking and fixing the left leaf half nut part and the right leaf half nut part with the upper slide block.

Two crank arms of the upper crankshaft 2-11 are disposed between the two first touch pieces. The main shaft journal of the crankshaft is connected with a power mechanism disposed inside the rack. The power mechanism can drive the upper crankshaft to rotate within a set angle range. The crank arms of the upper crankshaft can be in contact with the washer nuts. The washer nuts drive the upper slide block to move up and down.

By using the half nut and the washer nut, the position of the upper slide block relative to the upper crankshaft can be changed so as to change the pressing stroke of the upper punch.

Figure 16:
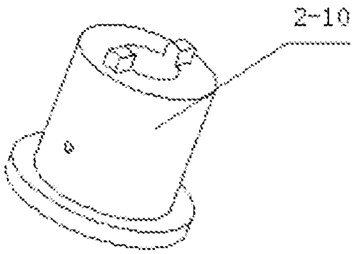
FIG. 16 is a schematic structural view of an upper punch according to the embodiment 1 of the present invention.
Figure 17:
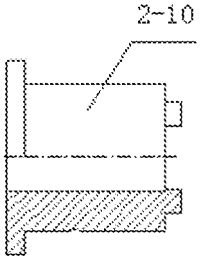
FIG. 17 is a cross-sectional view of the upper punch according to the embodiment 1 of the present invention.
Figure 18:
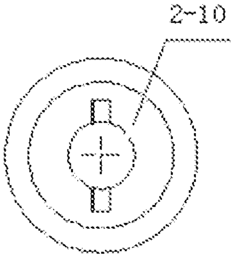
FIG. 18 is a top view of the upper punch according to the embodiment 1 of the present invention.

The bottom end of the lower slide block is fixedly provided with an upper punch 2-10, as shown in FIG. 16 to FIG. 18, the bottom end of the upper punch is provided with a convex head, the top end of the upper punch is provided with an outer lug boss, and the middle of the upper punch is provided with a circular through hole along an axial direction. The diameter of the circular through hole is slightly greater than that of the mandrel, and a vent hole is formed in a side surface of the upper punch at a position close to the outer lug boss.

The workbench mechanism includes a workbench 3-5 and a middle mold seat 3-4 which are disposed up and down. The top end of the middle mold seat is provided with a middle mold coaxially disposed with the upper punch.

Figure 19:
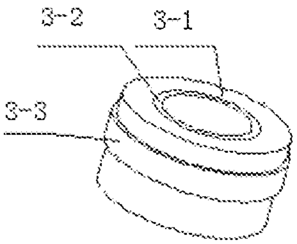
FIG. 19 is a schematic structural view of a middle mold according to the embodiment 1 of the present invention.
Figure 20:
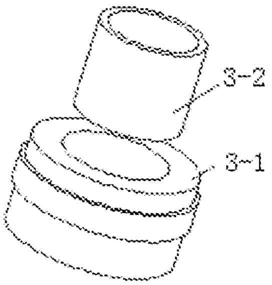
FIG. 20 is a schematic exploded view of FIG. 19 according to the embodiment 1 of the present invention.
Figure 21:
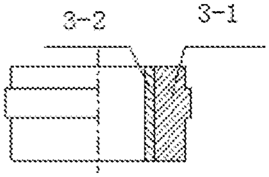
FIG. 21 is a cross-sectional view of the middle mold according to the embodiment 1 of the present invention.

As shown in FIG. 19 to FIG. 21, the middle mold includes a middle mold body 3-1, and a middle mold alloy sleeve 3-2 is embedded in the middle mold body. A dry pressing mold is a main component for molding and is in contact with powder having large abrasiveness, and a blank and a mold wall move relatively under a large positive pressure, so the mold wall is required to have higher smoothness, geometric accuracy and dimensional accuracy and especially have higher surface hardness, so as to realize large abrasion resistance, long service life, easy demolding and consistent product specifications. Therefore, a middle mold alloy sleeve which has higher smoothness, geometric accuracy and dimensional accuracy and especially has higher surface hardness is disposed inside the middle mold body, and the middle mold alloy sleeve and the middle mold body are in interference fit. The middle of an outer side surface of the middle mold body is provided with a lug boss 3-3.

Figure 22:
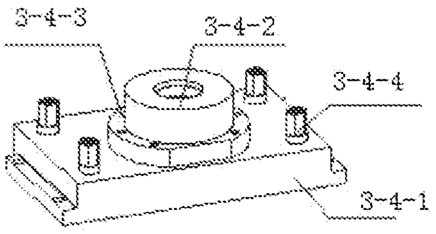
FIG. 22 is a schematic structural view of a middle mold seat according to the embodiment 1 of the present invention.
Figure 23:
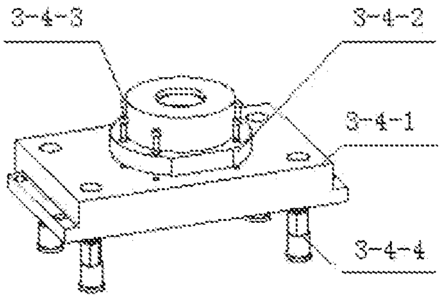
FIG. 23 is a schematic exploded view of the middle mold seat according to the embodiment 1 of the present invention.

As shown in FIG. 22 and FIG. 23, the middle mold seat 3-4 includes a middle mold support seat 3-4-1 and a middle mold nesting cylinder 3-4-2 fixed at the middle position of the middle mold support seat through middle mold nesting set screws 3-4-3. The middle mold nesting cylinder is provided with a stepped through hole, including a first hole section, a second hole section and a third hole section which are disposed up and down. The diameter of the first hole section is greater than the diameter of the second hole section. The diameter of the second hole section is greater than the diameter of the third hole section. The diameter of the first hole section is equal to the outer diameter of the lug boss on the outer circumferential surface of the middle mold body. The depth of the first hole section is slightly less than the axis height of the lug boss. The diameter of the second hole section is greater than the outer diameter of the edge of the lower side of the middle mold body. The hole depth of the second hole section is slightly greater than the axial distance from the bottom end of the middle mold body to the lower end surface of the lug boss. The hole diameter of the third hole section is slightly greater than the outer diameter of the lower slide block described below.

The middle mold is placed in the stepped hole of the middle mold nesting cylinder. The lower end surface of the lug boss is placed on a stepped surface formed by the first hole section and the second hole section.

Four corners of the middle mold support seat are embedded into internal thread fastening sleeves 3-4-4 through the stepped through hole. The internal thread fastening sleeves are in clearance fit with the stepped through hole and can rotate freely.

The internal thread fastening sleeves can be in threaded connection with threaded connecting rods 3-5-1 disposed on the bottom surface of the workbench. The workbench is provided with a through hole having a diameter greater than the outer diameter of the middle mold body and less than the outer diameter of the lug boss on the middle mold body. The workbench can be lowered by rotating the internal thread fastening sleeves. The lower surface of the workbench is in contact with the upper end surface of the lug boss of the middle mold body. The middle mold is tightly pressed in the stepped hole of the middle mold nesting cylinder.

Figure 24:
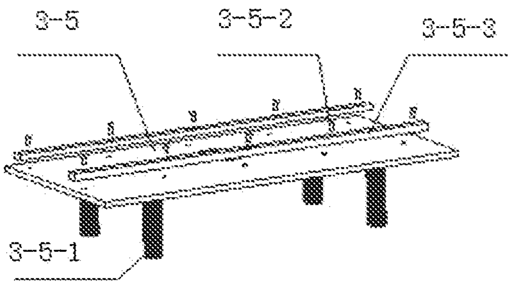
FIG. 24 is a schematic structural view of a workbench according to the embodiment 1 of the present invention.

As shown in FIG. 24, the upper surface of the workbench is provided with two guide bars 3-5-3 through guide bar screws 3-5-2. The guide bars are symmetrically disposed on two sides of the through hole of the workbench.

The second pressure mechanism 4 includes a lower slide block 4-1 with a cylindrical structure. The top end of the lower slide block runs through the middle mold support seat and extends into the third hole section of the middle mold nesting cylinder. The top end of the lower slide block is fixedly provided with a lower punch 4-2. The lower punch and the upper punch are coaxially disposed. The middle of the lower punch is provided with a through hole. The hole diameter of the through hole is slightly greater than the outer diameter of the mandrel.

Figure 25:
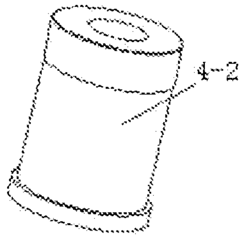
FIG. 25 is a schematic structural view of a lower punch according to the embodiment 1 of the present invention.
Figure 26:
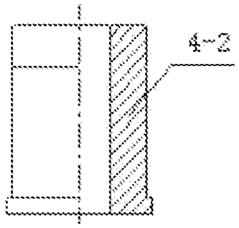
FIG. 26 is a cross-sectional view of the lower punch according to the embodiment 1 of the present invention.

As shown in FIG. 25 and FIG. 26, the lower punch includes a first lower punch section and a second lower punch section which are disposed up and down. The outer diameter of the first lower punch section is greater than the outer diameter of the second lower punch section. The bottom end of the second lower punch section is provided with an outer lug boss. The lower punch is fixedly connected with the top end of the lower slide block through the outer lug boss and a pressing ring.

Figure 27:
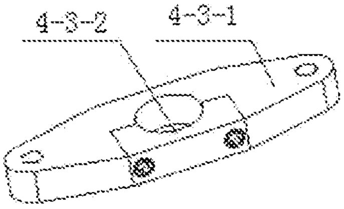
FIG. 27 is a schematic structural view of a second fixing seat according to the embodiment 1 of the present invention.
Figure 28:
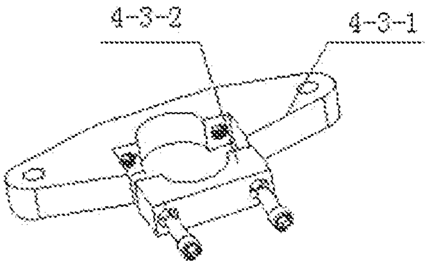
FIG. 28 is a schematic exploded view of FIG. 27 of the present invention.
Figure 39:
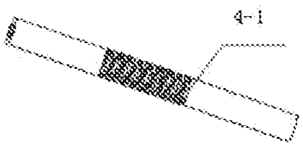
FIG. 39 is a schematic structural view of a lower slide block according to the embodiment 1 of the present invention.

As shown in FIG. 39, the outer circumferential surface of the lower slide block is provided with a threaded section, and the lower slide block is fixedly provided with a second fixing seat 4-3. As shown in FIG. 27 and FIG. 28, the second fixing seat is disposed on the lower slide block part below the middle mold seat and includes a sixth fixing part 4-3-1 and a seventh fixing part 4-3-2, and the sixth fixing part and the fifth fixing part can be fixed through two internal hexagonal cylindrical head screws and clamp the lower slide block.

Figure 29:
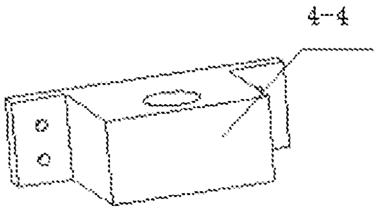
FIG. 29 is a schematic structural view of a second guide seat according to the embodiment 1 of the present invention.

As shown in FIG. 29, a second guide seat 4-4 is disposed between the second fixing seat and the middle mold support seat, and the second guide seat is configured to guide the up-and-down movement of the lower slide block.

The lower slide block is connected with the lower driving mechanism. The lower driving mechanism can drive the lower slide block to move up and down. The lower driving mechanism includes a lower crankshaft 4-5 and two second touch pieces 4-6 disposed on the threaded section of the lower slide block. The structure of the second touch piece is the same as the structure of the first touch piece, except that the lower second touch piece is not provided with a washer nut, and the specific structure thereof is not described in detail here.

Figure 30:
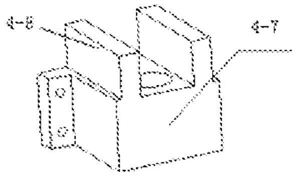
FIG. 30 is a schematic structural view of a limiting block according to the embodiment 1 of the present invention.
Figure 31:
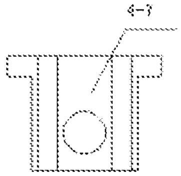
FIG. 31 is a top view of the limiting block according to the embodiment 1 of the present invention.
Figure 32:
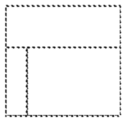
FIG. 32 is a side view of the limiting block according to the embodiment 1 of the present invention.

As shown in FIG. 30 to FIG. 32, a limiting block 4-7 is disposed below the lower second touch piece. The upper end surface of the limiting block is provided with two limiting plates 4-8. The distance between the two limiting plates is less than the outer diameter of the half nut. The limiting plates can be in contact with the half nut of the lower second touch piece so as to limit the downward movement position of the lower slide block.

The limiting block is also provided with a through hole having a diameter slightly greater than that of the lower slide block, so that the lower slide block can run through the limiting block via the through hole.

The main shaft journal of the lower crankshaft is connected with a power mechanism disposed inside the rack. The crank arms of the lower crankshaft are disposed between the two second touch pieces. The rotation of the lower crankshaft can drive the lower slide block to move up and down through the second touch pieces.

Figure 33:
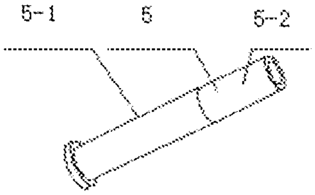
FIG. 33 is a schematic structural view of a mandrel according to the embodiment 1 of the present invention.
Figure 34:
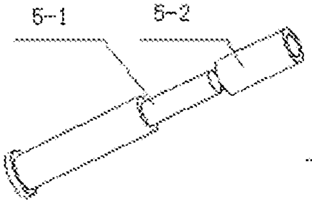
FIG. 34 is a schematic exploded view of FIG. 33 of the present invention.
Figure 35:
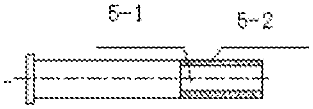
FIG. 35 is a cross-sectional view of the mandrel according to the embodiment 1 of the present invention.

As shown in FIG. 33 to FIG. 35, a mandrel 5 is coaxially disposed inside the middle mold. The mandrel includes a mandrel body 5-1 in a shape of a stepped shaft. The periphery of the part having a smaller diameter of the mandrel body is sleeved with a mandrel alloy sleeve 5-2. The mandrel alloy sleeve and the mandrel body are in interference fit. The mandrel alloy sleeve has preset higher smoothness, geometric accuracy and dimensional accuracy and especially has preset higher surface hardness. The device can be adapted to various powders having large abrasiveness, and is high in abrasion resistance, long in service life and easy in demolding, and the product specifications are consistent.

Figure 36:
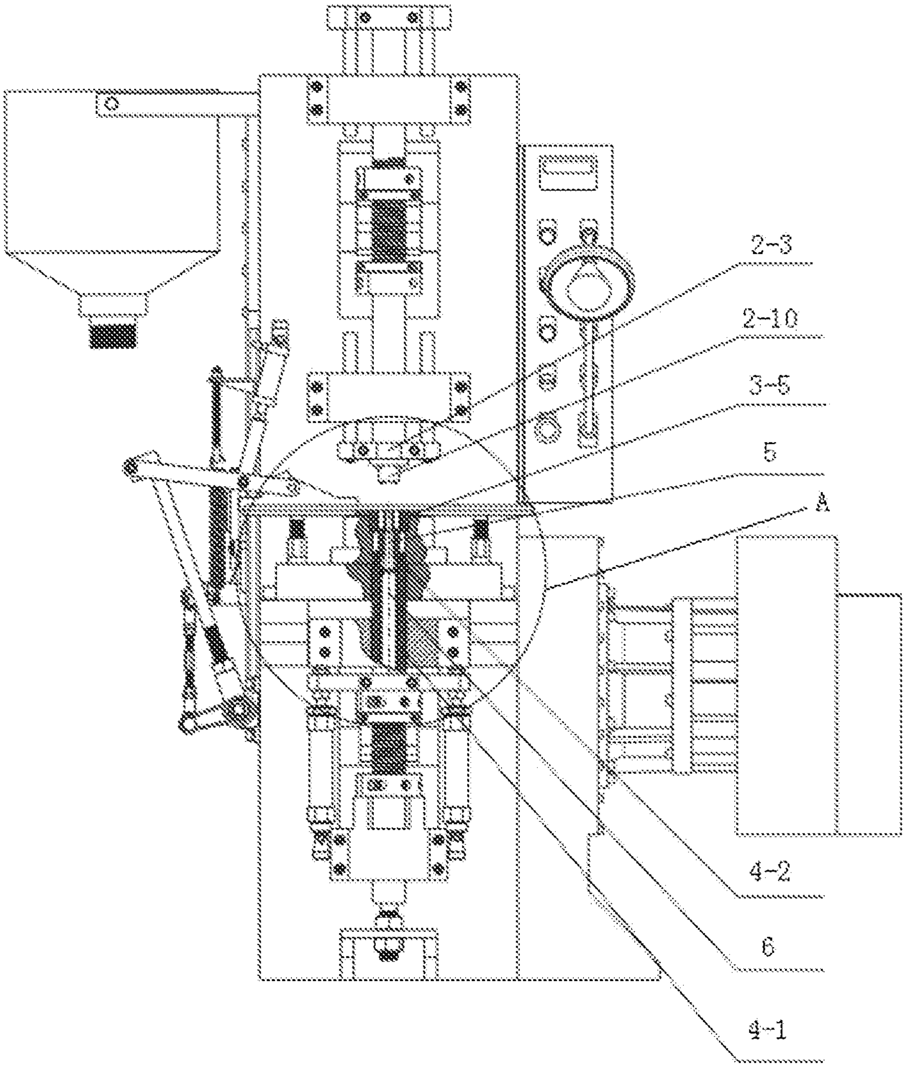
FIG. 36 is a front view of an overall structure of the present invention.
Figure 37:
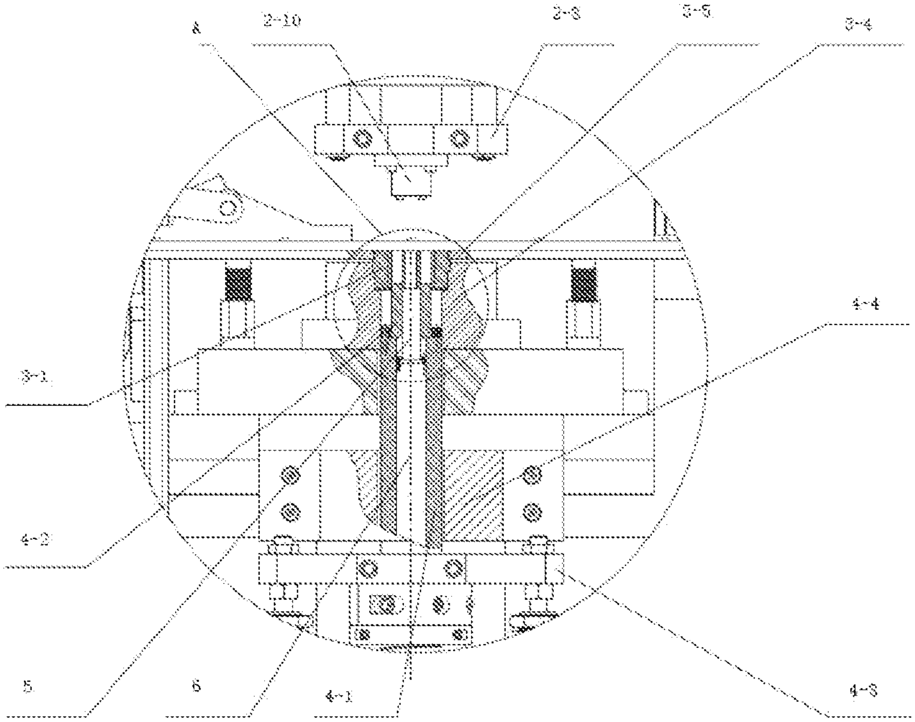
FIG. 37 is a schematic enlarged view of a part A in FIG. 36 of the present invention.
Figure 38:
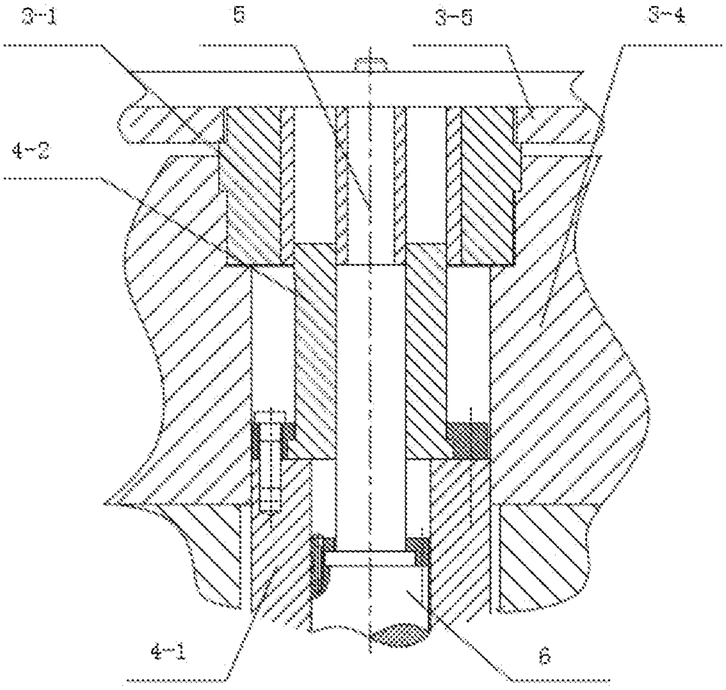
FIG. 38 is a schematic enlarged view of a part A in FIG. 37 of the present invention.

As shown in FIG. 36 to FIG. 38, the outer circumferential surface of the mandrel alloy sleeve and the inner circumferential surface of the middle mold alloy sleeve constitute a compacting space for containing powder. The mandrel can run through the lower punch via the through hole in the middle of the lower punch, so that the lower punch can extend into the compacting space. The mandrel can also run through the through hole in the middle of the upper punch, so that the upper punch can extend into the compacting space. The upper punch and the lower punch are used to compact the powder in the compacting space.

Figure 40:
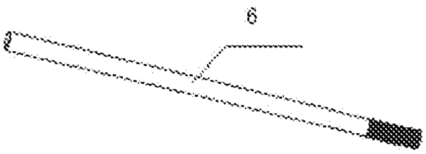
FIG. 40 is a schematic structural view of a connecting rod according to the embodiment 1 of the present invention.
Figure 41:
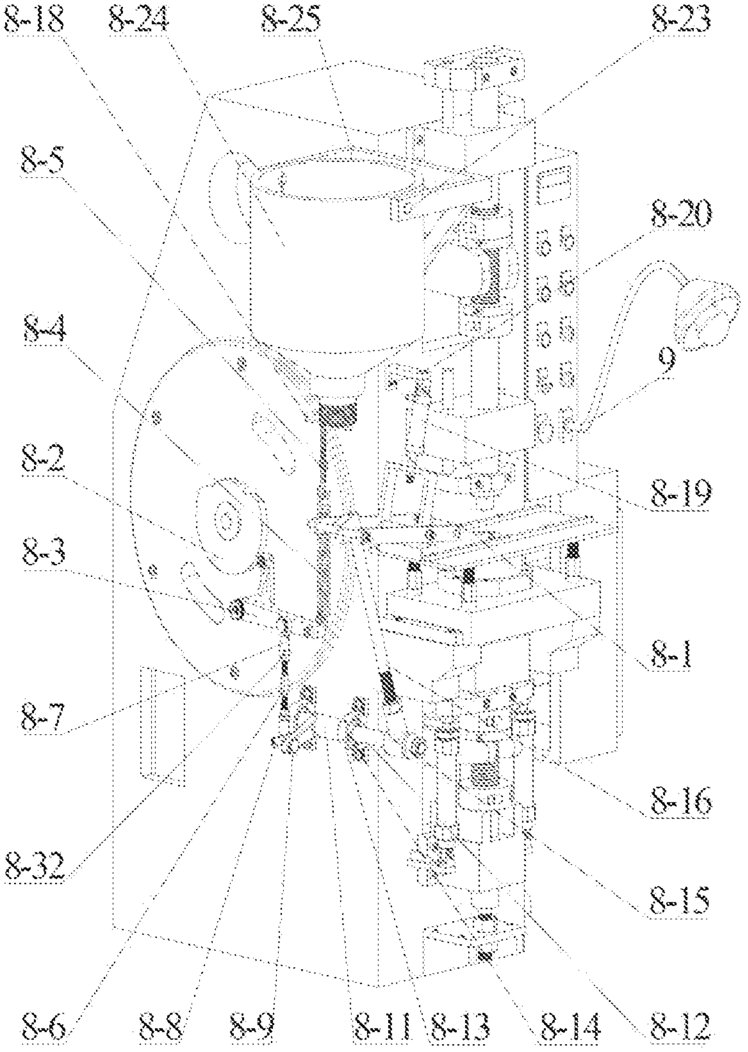
FIG. 41 is a schematic structural view of a scraping mechanism according to the embodiment 1 of the present invention.
Figure 42:
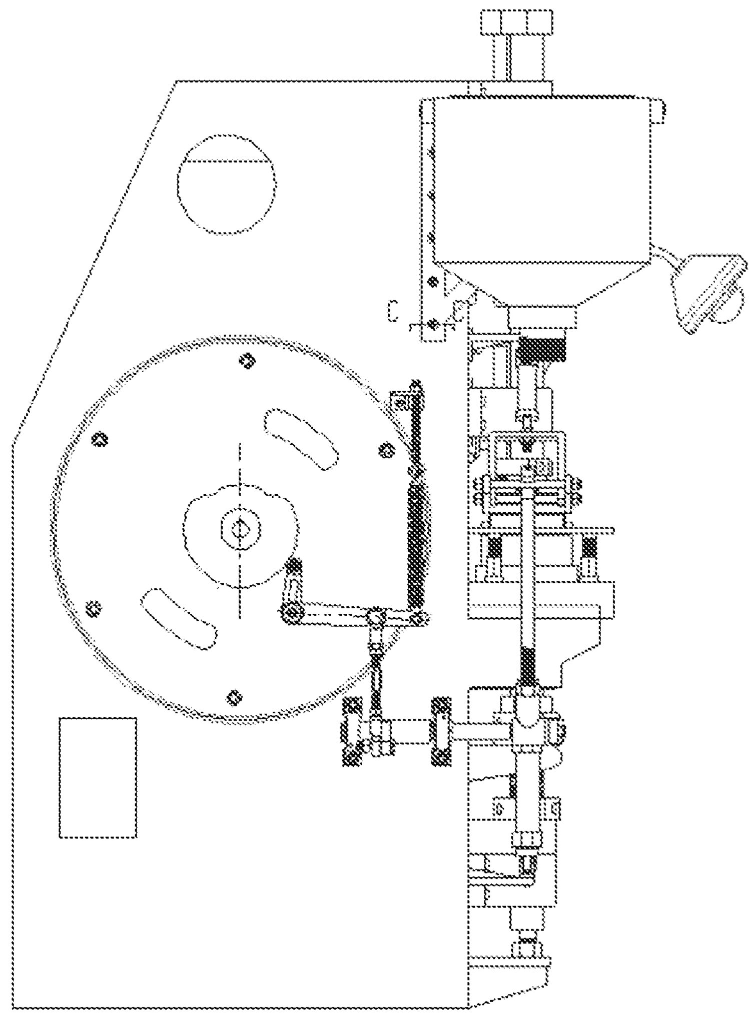
FIG. 42 is a front view of the scraping mechanism according to the embodiment 1 of the present invention.
Figure 43:
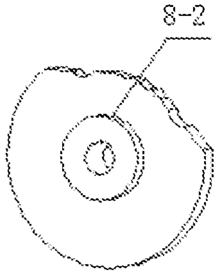
FIG. 43 is a schematic structural view of a cam according to the embodiment 1 of the present invention.
Figure 44:
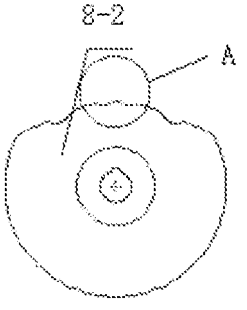
FIG. 44 is a top view of the cam according to the embodiment 1 of the present invention.
Figure 45:
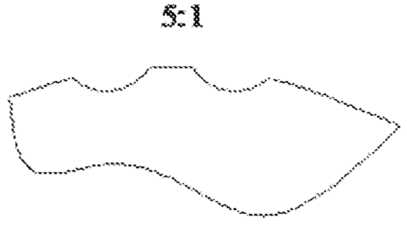
FIG. 45 is a schematic enlarged view of a part A in FIG. 44 of the present invention.
Figure 46:
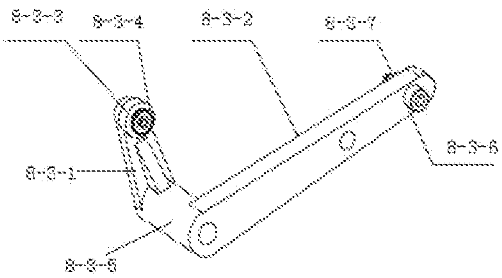
FIG. 46 is a schematic structural view of a connecting piece according to the embodiment 1 of the present invention.
Figure 47:
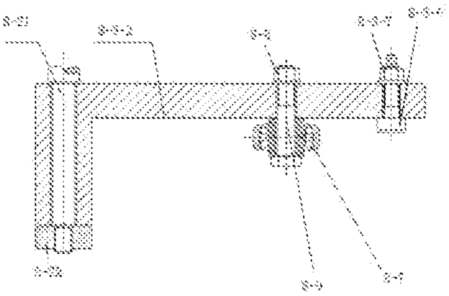
FIG. 47 is a schematic assembly view of a connecting piece and a base fixing shaft according to the embodiment 1 of the present invention.
Figure 48:
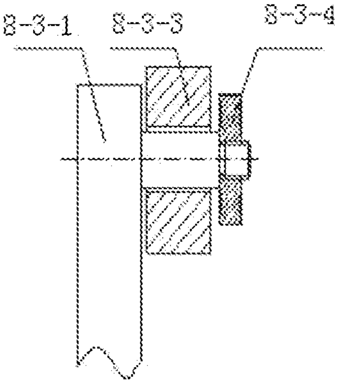
FIG. 48 is a schematic assembly view of a first push rod and a roller according to the embodiment 1 of the present invention.
Figure 49:
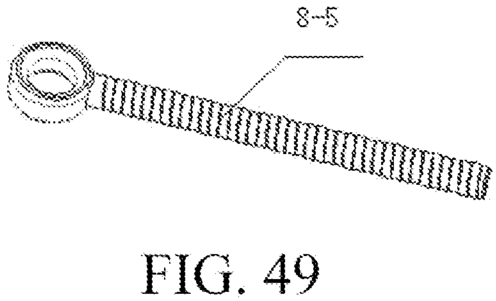
FIG. 49 is a schematic view of a fixing rod according to the embodiment 1 of the present invention.
Figure 50:
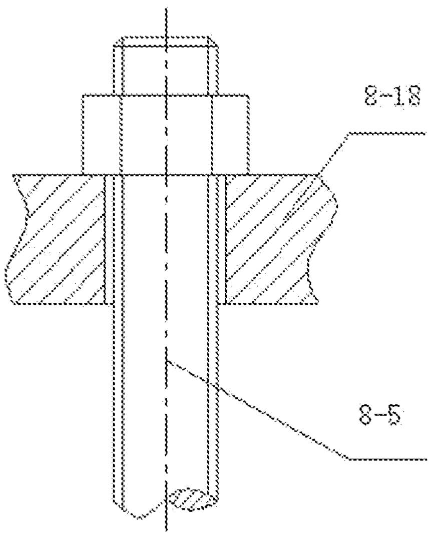
FIG. 50 is a schematic view of fixation of the fixing rod according to the embodiment 1 of the present invention.
Figure 51:
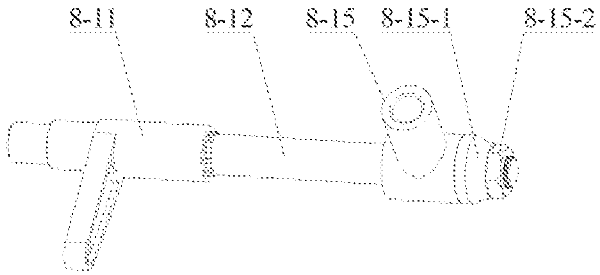
FIG. 51 is a schematic assembly view of an L-shaped sleeve, a T-shaped sleeve and a rotating shaft according to the embodiment 1 of the present invention.
Figure 52:
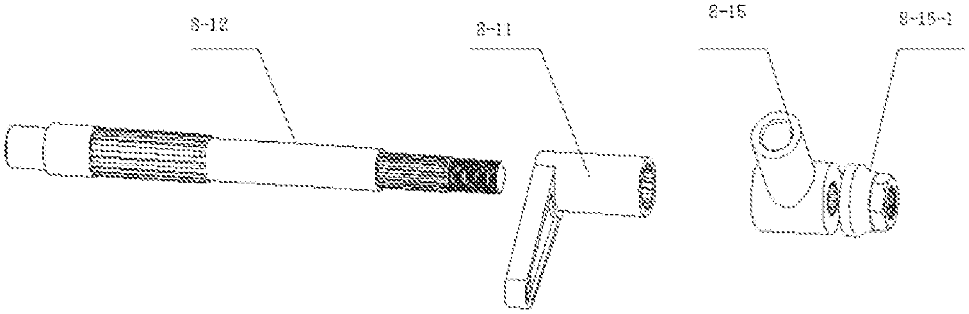
FIG. 52 is a schematic exploded view of FIG. 51 of the present invention.
Figure 53:
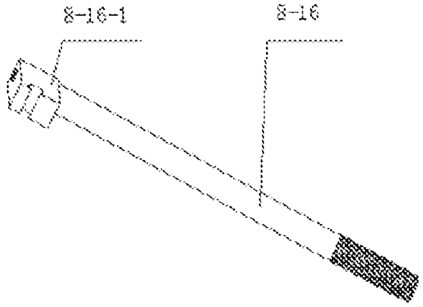
FIG. 53 is a schematic view of a pull rod mechanism according to the embodiment 1 of the present invention.
Figure 54:
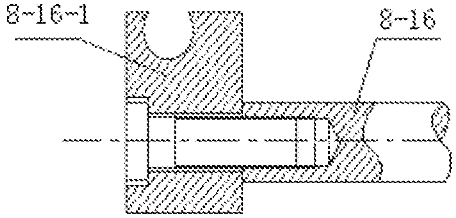
FIG. 54 is a schematic assembly view of a clamping plate according to the embodiment 1 of the present invention.
Figure 55:
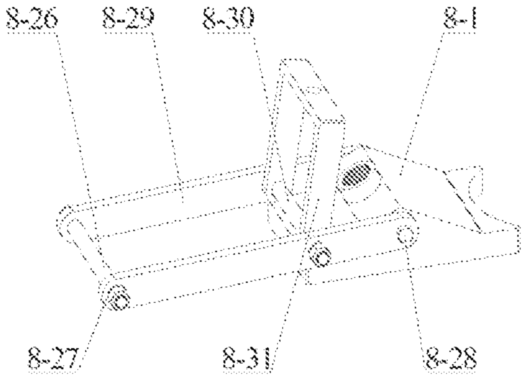
FIG. 55 is a schematic assembly view of a pusher and a scraping driving mechanism according to the embodiment 1 of the present invention.
Figure 56:
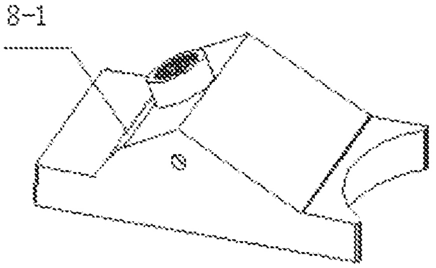
FIG. 56 is a schematic structural view of the pusher according to the embodiment 1 of the present invention.
Figure 57:
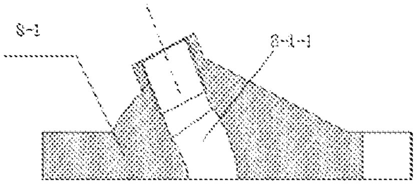
FIG. 57 is a schematic structural view of a feeding channel according to the embodiment 1 of the present invention.
Figure 58:
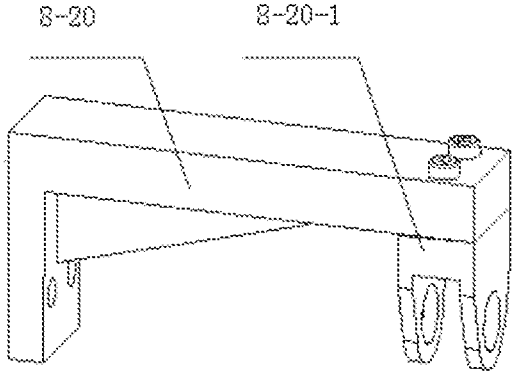
FIG. 58 is a schematic structural view of a hinged seat of the present invention.

The end of the part having a larger diameter of the mandrel body is provided with an outer lug boss, and is fixedly connected with the top end of a connecting rod 6 through a pressing ring and screws. As shown in FIG. 40, the bottom end of the connecting rod is provided with a threaded rod. After the connecting rod runs through the middle mold support seat, the second guide seat and the lower slide block, the bottom end of the connecting rod is fixedly connected with a connecting rod fixing plate. Specifically, the threaded rod at the bottom end of the connecting rod runs through the connecting rod fixing plate, fixing nuts are tightened on both sides of the connecting rod fixing plate, the connecting rod is fixed by the fixing nuts, and the vertical position of the connecting rod can be adjusted by loosening the fixing nuts, so as to adjust the vertical position of the mandrel.

The lower slide block is also connected with the resetting driving piece through the second fixing seat, and the resetting driving piece can drive the lower slide block to move upward.

The resetting driving piece adopts two resetting cylinders 7 which are symmetrically disposed on two sides of the lower slide block. A piston rod of the resetting cylinder is fixedly connected with the second fixing seat. A cylinder body of the resetting cylinder is hinged to a cylinder seat. The cylinder seat is fixed on the rack.

The resetting cylinder can drive the lower punch to move downward in the compacting space, thereby vacuumizing the compacting space.

As shown in FIG. 41 to FIG. 58, the scraping mechanism 8 includes a pusher 8-1. The pusher is in sliding connection with the workbench and can move along the workbench, and guide bars on the workbench are used for guiding.

A feeding channel 8-1-1 is disposed inside the pusher. The feeding channel can be communicated with a barrel 8-24 through a feeding pipe. The barrel is hinged to a barrel frame 8-25 through a pin shaft 8-23. The barrel frame is fixedly connected with the rack through internal hexagonal cylindrical head screws. The bottom end of the barrel is provided with an external threaded pipe. The external threaded pipe can be in threaded connection with the feeding pipe.

When the pusher moves until the feeding channel is communicated with the compacting space, the resetting cylinders drive the lower punch to move downward, the compacting space can be vacuumized, and thus, the powder in the barrel enters the compacting space.

The end surface of one end of the pusher is an arc-shaped surface. The middle position of the pusher is connected with the scraping driving mechanism. The scraping driving mechanism can drive the pusher to move on the workbench.

The scraping driving mechanism includes a cam 8-2 connected with the power mechanism in the rack. The surface of the near rest section of the cam is provided with a wave structure. The outer wheel surface of the cam is in contact with one end of a connecting piece 8-3.

The connecting piece 8-3 includes a first connecting part and a second connecting part which are vertically disposed. The first connecting part is a first push rod 8-3-1. The second connecting part is a second push rod 8-3-2. The end of the first push rod is connected with the end of the second push rod through a connecting post. The end of the first push rod is rotationally connected with a roller 8-3-3. The roller is disposed on a roller shaft. The end of the roller shaft is provided with a roller limiting cover 8-3-4 for limiting the roller. The roller is in contact with the outer wheel surface of the cam.

One end of the second push rod is fixedly connected with a connecting post 8-3-5 integrally, and the other end of the second push rod is provided with a support post 8-3-6 for an internal hexagonal extension spring. A fastening nut 8-3-7 for the support post for the internal hexagonal extension spring is fixed on the second push rod.

The connecting post at the intersecting position of the first push rod and the second push rod is rotationally connected with the rack through a base fixing shaft 8-21. The end of the base fixing shaft is provided with an end cover 8-22 for limiting the connecting post to move along the axial direction of the base fixing shaft.

The support post for the internal hexagonal extension spring is fixedly connected with one end of an elastic piece. The elastic piece adopts a spring 8-4. The other end of the spring is fixedly connected with a fixing rod 8-5 through a pull ring at the end of the pull rod. The fixing rod is a threaded rod. The upper end of the fixing rod runs through a threaded rod fixing plate 8-18, and fixing nuts are tightened. After the fixing nuts are loosened, the position of the pull rod can be adjusted along a vertical direction, so as to adjust the elongation of the spring. Under the action of the spring, the roller is always in contact with the cam.

The middle position of the second push rod is universally connected with one end of a middle piece. The middle piece adopts a double threaded connecting rod 8-6. One end of the double threaded connecting rod is connected with the middle position of the second push rod through a joint bearing 8-7, a joint bearing fastening nut 8-8 and a joint bearing fastening bolt 8-9, and the other end of the double threaded connecting rod is universally connected with a rotating piece at one end of a rotating shaft 8-12 through the joint bearing, the joint bearing fastening nut and a joint bearing fastening bolt 8-10. The rotating piece is an L-shaped sleeve 8-11. The joint bearing is locked with the double threaded connecting rod by a joint bearing locking nut 8-32.

The L-shaped sleeve has a connecting part and a sleeve part which are vertically disposed. The connecting part is universally connected with the double threaded connecting rod. The sleeve part is connected with the outer circumferential surface of the rotating shaft through a spline. The rotating shaft is fixedly connected with the inner ring part of two vertical mounted bearings 8-13 through internal hexagonal flat-end set screws 8-14. The rotating shaft can rotate freely. The other end of the rotating shaft is connected with a T-shaped sleeve 8-15 through a spline. The T-shaped sleeve is fastened by a fastening cover 8-15-1 and a T-shaped sleeve fastening nut 8-15-2 connected with the rotating shaft.

The rotating shaft is a stepped shaft and is provided with an external thread section, a first spline section, a first polished shaft section, a second spline section and a second polished shaft section in sequence. The first spline section is configured to be connected with the T-shaped sleeve, and the length of the first spline section is slightly less than the transverse sleeve length of the T-shaped sleeve. The length of a fourth spline section is slightly larger than the axial length of the L-shaped sleeve. The diameter of the first spline section is greater than the diameter of the external thread section and less than the diameter of the first polished shaft section. The diameter of the second polished shaft section is greater than the diameter of the first polished shaft section.

The T-shaped sleeve is in threaded connection with the bottom end of a pull rod 8-16 and is fixed by a pull rod locking nut 8-17. The top end of the pull rod is fixedly provided with a clamping plate 8-16-1. The clamping plate is provided with a clamping groove. The clamping plate is fixedly connected with a first connecting shaft 8-26 through the clamping groove. The first connecting shaft is a double threaded connecting shaft. Two ends of the double threaded connecting shaft are fixedly connected with one end of each of two connecting plates 8-29 respectively by connecting shaft fastening nuts 8-27. The other ends of the connecting plates are hinged to the middle position of the pusher 8-1 through fulcrum screws 8-28.

The outer wheel surface of the cam is always in contact with the roller under the action of the spring. The rotation of the cam can drive the connecting piece to rotate around the base fixing shaft. The second push rod drives the double threaded connecting rod to move. The double threaded connecting rod drives the rotating shaft to rotate through the L-shaped sleeve. The rotating shaft drives the pull rod to rotate through the T-shaped sleeve. The pull rod drives the pusher to move along the workbench through the first connecting shaft and the connecting plates.

When the roller is in contact with the wave structure of the near rest section of the cam, the pusher can reciprocate at a position within a certain range of the workbench above the compacting space, so as to scrape the powder.

A second connecting shaft 8-30 is further fixed between the two connecting plates. The structure and fixing manner of the second connecting shaft are the same as those of the first connecting shaft and will not be described in detail here. The second connecting shaft is rotationally connected with the bottom of a U-shaped frame 8-31. The top of the U-shaped frame is fixedly connected with a piston rod of a compressing cylinder 8-19. A cylinder body of the compressing cylinder is hinged to a lug plate 8-20-1 of a hinged seat 8-20. The hinged seat 8-20 is fixed on the rack. The piston rod of the compressing cylinder extends to ensure that the pusher is attached to the upper surface of the workbench all the time.

In the present embodiment, the scraping mechanism, the first pressure mechanism and the second pressure mechanism are all connected with a control system. The control system controls the corresponding components to work automatically. A control console is disposed on the rack and is configured to send instructions to the control system. An illuminating lamp 9 is also mounted on the rack and is configured to provide lighting conditions during working.

Embodiment 2

The present embodiment discloses a working method of the powder dry-pressing molding device described in the embodiment 1:

Powder is put into the barrel, and the barrel is communicated with the feeding channel of the pusher through a feeding pipe. In the initial state, the roller is in contact with the far rest section of the cam, the cam is started to rotate, and the roller begins to enter the near rest section of the cam. At this time, the feeding channel of the pusher is aligned with the compacting space formed by the mandrel and the middle mold, the resetting cylinder works to drive the lower punch to move downward, a vacuum is formed in the compacting space, the powder is sucked into the compacting space, and thus, the compacting space is filled with the powder. By adopting the method of vacuum suction of the powder, the internal void of the powder is reduced, and the molding quality is higher. The cam continues to rotate, and under the action of the wave structure, the pusher reciprocates within a certain range of the workbench above the compacting space, so as to scrape the powder. The cam continues to rotate, and the roller is in contact with the far rest section of the cam. At this time, the pusher returns to the original position, the upper crankshaft and the lower crankshaft rotate, the upper punch enters the compacting space, and the lower punch enters the compacting space, so as to perform bidirectional compaction of the powder. When the upper punch and the lower punch move to the set position, that is, the bottom dead center, the pressing ends, the upper punch moves upward to reset, the lower punch moves upward to the extreme position (that is, the position flush with the upper surface of the workbench) so as to eject the compacted blank out, the cam rotates, the roller is in contact with the near rest section of the cam again, and the pusher ejects the blank out. Powder filling in the compacting space is performed at the same time. The same method is adopted to work repeatedly.

When powder is pressed, the torque transmitted by the upper crankshaft is $T_1$N.m, the vertical distance from the center of the upper punch to the upper crankshaft is $L_1$ m (moment arm), and then, the pressing force of the upper punch is $F_1$N:

$$T_1=F_1\times L_1 \quad (1).$$

The torque transmitted by the lower crankshaft is $T_2$N.m, the vertical distance from the center of the lower punch to the lower crankshaft is $L_2$ m (moment arm), and then, the pressing force of the lower punch is $F_2$N:

$$T_2=F_2\times L_2 \quad (2).$$

During the pressing molding process, the depth of the compacting space is H mm, the thickness of the blank after pressing is h mm, and the compression amount of the single-sided pressurized powder is δ mm:

$$\delta=H-h \text{ mm} \quad (3).$$

During pressing, the pressurization area of the upper punch and the lower punch is A $cm^2$, the total pressure is P N, and then, the average pressure of pressing is p Pa:

$$p=\frac{P}{A}\text{Pa}. \quad (4)$$

The torque transmitted by the crankshaft is constant. During pressing, the upper slide block is driven by the upper crankshaft to move downward, the moment arm decreases slowly, and the punching force of the upper punch increases slowly. In a similar way, the lower slide block is driven by the lower crankshaft to move upward, and the punching force of the lower punch increases slowly. The problems of uneven blank density, cracking, larger deformation, and the like are improved.

The specific implementations of the present invention are described above with reference to the accompanying drawings, but are not intended to limit the protection scope of the present invention. Those skilled in the art should understand that various modifications or deformations may be made without creative efforts based on the technical solutions of the present invention, and such modifications or deformations shall fall within the protection scope of the present invention.

What is claimed is:

1. A powder dry-pressing molding device, comprising a rack, wherein the rack is provided with a first pressure mechanism, a workbench mechanism and a second pressure mechanism in sequence along an up-and-down direction, and one side of the workbench mechanism is provided with a scraping mechanism;

the first pressure mechanism comprises an upper slide block capable of moving up and down, the upper slide block is connected with an upper driving mechanism, and an upper punch is disposed at a bottom of the upper slide block;

the workbench mechanism comprises a middle mold seat, a workbench is fixed above the middle mold seat, a middle mold is disposed inside the middle mold seat, a mandrel fixedly disposed coaxially with the middle mold runs through the inside of the middle mold, and a compacting space for containing powder is formed between the mandrel and the middle mold;

the second pressure mechanism comprises a lower slide block capable of moving up and down, the lower slide block is connected with a lower driving mechanism, a lower punch is fixed at a top end of the lower slide block, and the lower punch is capable of extending into the compacting space between the mandrel and the middle mold and compacting the powder together with the upper punch; and the scraping mechanism comprises a pusher connected with a scraping driving mechanism and capable of moving along the workbench, the pusher is provided with a feeding channel capable of being communicated with the compacting space, the feeding channel is capable of being communicated with a barrel disposed on the rack, and after the feeding channel is aligned with the compacting space, the lower punch moves downward to generate a vacuum so as to suck the powder into the compacting space.

2. The powder dry-pressing molding device according to claim 1, wherein both ends of the upper slide block are fixedly provided with a first fixing seat respectively, the first fixing seat is fixedly provided with a first guide post, and the first guide post runs through a first guide seat fixed on the rack so as to guide the movement of the upper slide block.

3. A method using the powder dry-pressing molding device according to claim 2, the method comprising:

moving the pusher to align the feeding channel with the compacting space;

moving the lower punch downward to vacuumize the compacting space;

providing the powder into the compacting space;

reciprocating the pusher along the workbench part above the compacting space to scrape the powder; and moving the upper punch downward and moving the lower punch upward to press the powder in two directions so as to form a blank.

4. The powder dry-pressing molding device according to claim 2, wherein a part of the lower slide block below the workbench mechanism is fixedly provided with a second fixing seat, the second fixing seat is fixedly provided with a second guide post, and the second guide post runs through a second guide seat fixed on the rack so as to guide the movement of the lower slide block.

5. A method using the powder dry-pressing molding device according to claim 4, the method comprising:

moving the pusher to align the feeding channel with the compacting space;

moving the lower punch downward to vacuumize the compacting space;

providing the powder into the compacting space;

reciprocating the pusher along the workbench part above the compacting space to scrape the powder; and moving the upper punch downward and moving the lower punch upward to press the powder in two directions so as to form a blank.

6. The powder dry-pressing molding device according to claim 1, wherein the upper driving mechanism comprises an upper crankshaft capable of actively rotating and two first touch pieces fixed on the upper slide block, crank arms of the upper crankshaft are located between the two first touch pieces, the rotation of the upper crankshaft enables the crank arms to be in contact with the two first touch pieces, and the first touch pieces drive the upper slide block to move up and down.

7. A method using the powder dry-pressing molding device according to claim 6, the method comprising:

moving the pusher to align the feeding channel with the compacting space;

moving the lower punch downward to vacuumize the compacting space;

providing the powder into the compacting space;

reciprocating the pusher along the workbench part above the compacting space to scrape the powder; and moving the upper punch downward and moving the lower punch upward to press the powder in two directions so as to form a blank.

8. The powder dry-pressing molding device according to claim 6, wherein the lower driving mechanism comprises a lower crankshaft capable of actively rotating and two second touch pieces disposed on the lower slide block, the lower crankshaft is fixedly provided with the two second touch pieces, crank arms of the lower crankshaft are disposed between the two second touch pieces, the rotating lower crankshaft is capable of being in contact with the two second touch pieces to drive the lower slide block to move up and down, a limiting block is disposed below the lower second touch piece, and the limiting block is configured to limit the downward movement of the lower slide block.

9. A method using the powder dry-pressing molding device according to claim 8, the method comprising:

moving the pusher to align the feeding channel with the compacting space;

moving the lower punch downward to vacuumize the compacting space;

providing the powder into the compacting space;

reciprocating the pusher along the workbench part above the compacting space to scrape the powder; and moving the upper punch downward and moving the lower punch upward to press the powder in two directions so as to form a blank.

10. The powder dry-pressing molding device according to claim 1, wherein the lower slide block is fixedly connected with one end of a resetting driving piece, the other end of the resetting driving piece is hinged to the rack, and the resetting driving piece is capable of driving the lower slide block to move downward to vacuumize the compacting space.

11. A method using the powder dry-pressing molding device according to claim 10, the method comprising:

moving the pusher to align the feeding channel with the compacting space;

moving the lower punch downward to vacuumize the compacting space;

providing the powder into the compacting space;

reciprocating the pusher along the workbench part above the compacting space to scrape the powder; and moving the upper punch downward and moving the lower punch upward to press the powder in two directions so as to form a blank.

12. The powder dry-pressing molding device according to claim 1, wherein the periphery of a top of the mandrel is sleeved with an alloy sleeve, a bottom end of the mandrel is fixedly connected with a top end of a connecting rod, and after the connecting rod runs through the middle mold seat and the second pressure mechanism, a bottom end of the connecting rod is fixedly connected with the rack.

13. A method using the powder dry-pressing molding device according to claim 12, the method comprising:

moving the pusher to align the feeding channel with the compacting space;

moving the lower punch downward to vacuumize the compacting space;

providing the powder into the compacting space;

reciprocating the pusher along the workbench part above the compacting space to scrape the powder; and moving the upper punch downward and moving the lower punch upward to press the powder in two directions so as to form a blank.

14. The powder dry-pressing molding device according to claim 1, wherein the scraping driving mechanism comprises a cam capable of rotating and provided with a wave structure in a near rest section and a connecting piece capable of being in contact with the cam, the connecting piece comprises a first connecting part and a second connecting part vertically disposed, an end of the first connecting part is in contact with the cam, an intersecting position of the first connecting part and the second connecting part is rotationally connected with the rack, one end of the second connecting part is connected with the first connecting part, the other end of the second connecting part is connected with the rack through an elastic piece, the second connecting part is universally connected with one end of a middle piece, the other end of the middle piece is universally connected with a rotating piece disposed on the outer circumferential surface of a rotating shaft, the rotating shaft is capable of rotating, an end of the rotating shaft is fixedly connected with one end of a pull rod, the other end of the pull rod is provided with a clamping plate, the clamping plate is clamped and fixed to a first connecting shaft, both ends of the first connecting shaft are fixedly connected with one end of a connecting plate respectively, and the other ends of two connecting plates are hinged to two side surfaces of the pusher.

15. The powder dry-pressing molding device according to claim 14, wherein a second connecting shaft is fixed between the two connecting plates, the second connecting shaft is hinged to the bottom of a U-shaped frame, the top end of the U-shaped frame is fixedly connected with one end of a compressing cylinder, the other end of the compressing cylinder is hinged to a hinged seat fixed on the rack, and the compressing cylinder enables the pusher to be attached to the workbench all the time.

16. A method using the powder dry-pressing molding device according to claim 15, the method comprising:

moving the pusher to align the feeding channel with the compacting space;

moving the lower punch downward to vacuumize the compacting space;

providing the powder into the compacting space;

reciprocating the pusher along the workbench part above the compacting space to scrape the powder; and moving the upper punch downward and moving the lower punch upward to press the powder in two directions so as to form a blank.

17. A method using the powder dry-pressing molding device according to claim 14, the method comprising:

moving the pusher to align the feeding channel with the compacting space;

moving the lower punch downward to vacuumize the compacting space;

providing the powder into the compacting space;

reciprocating the pusher along the workbench part above the compacting space to scrape the powder; and moving the upper punch downward and moving the lower punch upward to press the powder in two directions so as to form a blank.

18. A method using the powder dry-pressing molding device according to claim 1, the method comprising:

moving the pusher to align the feeding channel with the compacting space;

moving the lower punch downward to vacuumize the compacting space;

providing the powder into the compacting space;

reciprocating the pusher along the workbench part above the compacting space to scrape the powder; and moving the upper punch downward and moving the lower punch upward to press the powder in two directions so as to form a blank.

* * * * *